(12) United States Patent
Hirosawa et al.

(10) Patent No.: US 7,522,300 B2
(45) Date of Patent: Apr. 21, 2009

(54) NETWORK SCANNER AND MULTIFUNCTION MACHINE INCORPORATED WITH A NETWORK SCANNER

(75) Inventors: Takayuki Hirosawa, Tochigi (JP); Hidemi Nakadaira, Tochigi (JP)

(73) Assignee: Panasonic Corporation, Osaka (JP)

( * ) Notice: Subject to any disclaimer, the term of this patent is extended or adjusted under 35 U.S.C. 154(b) by 851 days.

(21) Appl. No.: 10/764,465

(22) Filed: Jan. 27, 2004

(65) Prior Publication Data
US 2005/0046893 A1 Mar. 3, 2005

(30) Foreign Application Priority Data
Aug. 27, 2003 (JP) ............................. 2003-302756

(51) Int. Cl.
*G06F 1/12* (2006.01)
(52) U.S. Cl. ...................... 358/1.15; 358/474; 358/402; 379/217; 379/204; 709/206; 709/104
(58) Field of Classification Search ................ 358/1.15, 358/402, 403, 442, 444, 404, 1, 9, 400, 474, 358/405; 379/100.17, 100.01; 709/206, 709/104; 382/250, 232, 170
See application file for complete search history.

(56) References Cited

U.S. PATENT DOCUMENTS

| | | | | |
|---|---|---|---|---|
| 5,717,794 | A * | 2/1998 | Koga et al. | ................... 382/309 |
| 5,881,233 | A | 3/1999 | Toyoda et al. | |
| 6,181,893 | B1 | 1/2001 | Collard et al. | |
| 6,424,429 | B1 * | 7/2002 | Takahashi et al. | .......... 358/1.16 |
| 6,463,435 | B1 | 10/2002 | Bergmans | |
| 6,466,327 | B2 * | 10/2002 | Inaba et al. | ................. 358/1.13 |
| 6,529,918 | B2 * | 3/2003 | Takahashi | ................... 707/205 |
| 6,557,045 | B1 | 4/2003 | Tsukui et al. | |
| 6,650,794 | B1 | 11/2003 | Aoki | |
| 6,692,167 | B2 | 2/2004 | Nakadaira et al. | |
| 6,701,099 | B2 * | 3/2004 | Yokobori et al. | ............... 399/45 |
| 6,775,023 | B1 * | 8/2004 | Fukunaga et al. | .......... 358/1.15 |
| 6,806,978 | B1 * | 10/2004 | Tamura et al. | ............. 358/1.15 |
| 6,985,246 | B2 * | 1/2006 | Utsunomiya | ................ 358/1.15 |
| 7,031,007 | B2 * | 4/2006 | Akiyama et al. | ........... 358/1.15 |
| 7,265,859 | B2 * | 9/2007 | Sato | ......................... 358/1.15 |
| 2001/0000027 | A1 | 3/2001 | Collard et al. | |

(Continued)

FOREIGN PATENT DOCUMENTS

EP 0944239 9/1999

(Continued)

OTHER PUBLICATIONS

English Language Abstract of JP 11-053527.

(Continued)

*Primary Examiner*—Negussie Worku
(74) *Attorney, Agent, or Firm*—Greenblum & Bernstein, P.L.C.

(57) ABSTRACT

In a network scanner for reading an original document and forwarding read data to a designated terminal connected to a network, an operating panel provided on the network scanner allows a destination and other image data processing conditions to be entered from the scanner. Therefore, an operator can determine the various processing conditions as well as the destination of the transmission data from the scanner so that the operator is not required to travel back and forth between the scanner and terminal and the work efficiency can be improved.

14 Claims, 9 Drawing Sheets

U.S. PATENT DOCUMENTS

| | | | |
|---|---|---|---|
| 2001/0024518 A1* | 9/2001 | Yaguchi | 382/170 |
| 2001/0038462 A1 | 11/2001 | Teeuwen et al. | |
| 2002/0027673 A1 | 3/2002 | Roosen et al. | |
| 2002/0105681 A1 | 8/2002 | Iyoki | |
| 2002/0184249 A1 | 12/2002 | Shibata | |
| 2003/0169447 A1 | 9/2003 | Nakadaira | |
| 2004/0070630 A1 | 4/2004 | Nagoshi et al. | |
| 2005/0044167 A1* | 2/2005 | Kobayashi et al. | 709/217 |

FOREIGN PATENT DOCUMENTS

| | | |
|---|---|---|
| EP | 1229718 | 8/2002 |
| JP | 9204515 | 8/1997 |
| JP | 11-053527 | 2/1999 |
| JP | 2002-214976 | 7/2002 |
| JP | 2002-271553 | 9/2002 |
| JP | 2002-368935 | 12/2002 |
| JP | 2003-069770 | 3/2003 |
| JP | 2003-114855 | 4/2003 |

OTHER PUBLICATIONS

English Language Abstract of JP 2003-114855.
English language Abstract and partial translation of JP 2002-271553.
English langauge Abstract and partial translation of JP 2002-368935.
English Language Abstract JP9204515.
English language Abstract and partial translation of JP 2003-069770.
English language Abstract of JP 2002-214976.

* cited by examiner

NETWORK SCANNER AND MULTIFUNCTION MACHINE
INCORPORATED WITH A NETWORK
SCANNER

FIELD OF THE INVENTION

The present invention relates to a network scanner that can read documents or other material by scanning and transmit read data to various terminals such as information processing systems typically in the form of personal computers (PCs) connected to a network system, and a multifunction machine incorporated with such a network scanner.

DESCRIPTION OF RELATED ART

In a network scanner, it is known to allow various processing conditions such as resolution and density to be designated from a terminal unit such as a personal computer which is also the recipient of the read data (see Japanese laid open patent publication No. 09-204515, for instance).

In such a network scanner, the operator enters various processing conditions from the terminal unit in advance, and transmits the processing condition data to the network scanner to be stored therein. The operator then travels to the network scanner to designate the processing condition data on a menu displayed on a monitor of the scanner according to prescribed identification information and scan the documents accordingly.

However, in such a conventional network scanner, the operator is required to travel between the terminal unit and network scanner that may be located remote from each other over and over again because of the need to operate both the terminal unit and network scanner. This severely impairs the work efficiency, and becomes a very acute problem when there are a large number of documents that need to be processed under different conditions.

SUMMARY OF THE INVENTION

The present invention was made with an aim to eliminate such a problem of the prior art, and its primary object is to provide a network scanner and a multifunction machine incorporated with a network scanner that allow the entire process of reading documents by scanning and transmitting the read data to the terminal unit to be conducted from the end of the scanner so that the work efficiency may be improved.

To achieve such an object, the present invention provides a network scanner for reading an original document and forwarding read data to a designated terminal connected to a network, comprising: an operating panel including input means and display means; and control means for acquiring information on a processing condition by controlling the operating panel so as to allow an operator to carry out a prescribed input operation via the operating panel, and executing the processes of reading an original document, generating transmission data and forwarding the transmission data to a designated terminal according to the acquired processing condition.

According another aspect of the present invention, there is provided a network scanner for reading an original document and forwarding read data to a designated terminal connected to a network, comprising: a reading unit for reading an original document by scanning and generating corresponding image data; a transmission data composing unit for processing the image data into transmission data; a network control unit for forwarding the transmission data to a plurality of terminals connected to the network; an operating panel including a display unit and a plurality of input keys; and a control unit for controlling actions of the reading unit, transmission data composing unit, network control unit and operating panel; wherein the display unit is adapted to list choices of the terminals and image processing conditions while the input keys are adapted to allow selection of the terminals and image processing conditions under control of the control unit.

Thereby, all the information on the processing conditions for executing a series of processes from the reading of the original document to the transmission of the data can be made available to the system simply by operating the operating panel on the side of the scanner so that the operator can perform all there is to operate from the end of the scanner, and the work efficiency can be improved.

The processing conditions which the system acquires by means of the operator's operation may include various reading conditions such as resolution power, density (gradation), image processing method and original size. Destination information such as an IP address and mail address for identifying each terminal on the network is required to be acquired for the data to be transmitted to each designated terminal. Such information may be registered in advance in association with the required destination information and destination names so that a desired destination may be selected or designated at the time of transmission.

By adding a recording unit, the network scanner of the present invention may be constructed as a multifunction machine.

BRIEF DESCRIPTION OF THE DRAWINGS

Now the present invention is described in the following with reference to the appended drawings, in which.

DETAILED DESCRIPTION OF PREFERRED EMBODIMENTS

Figure 1:
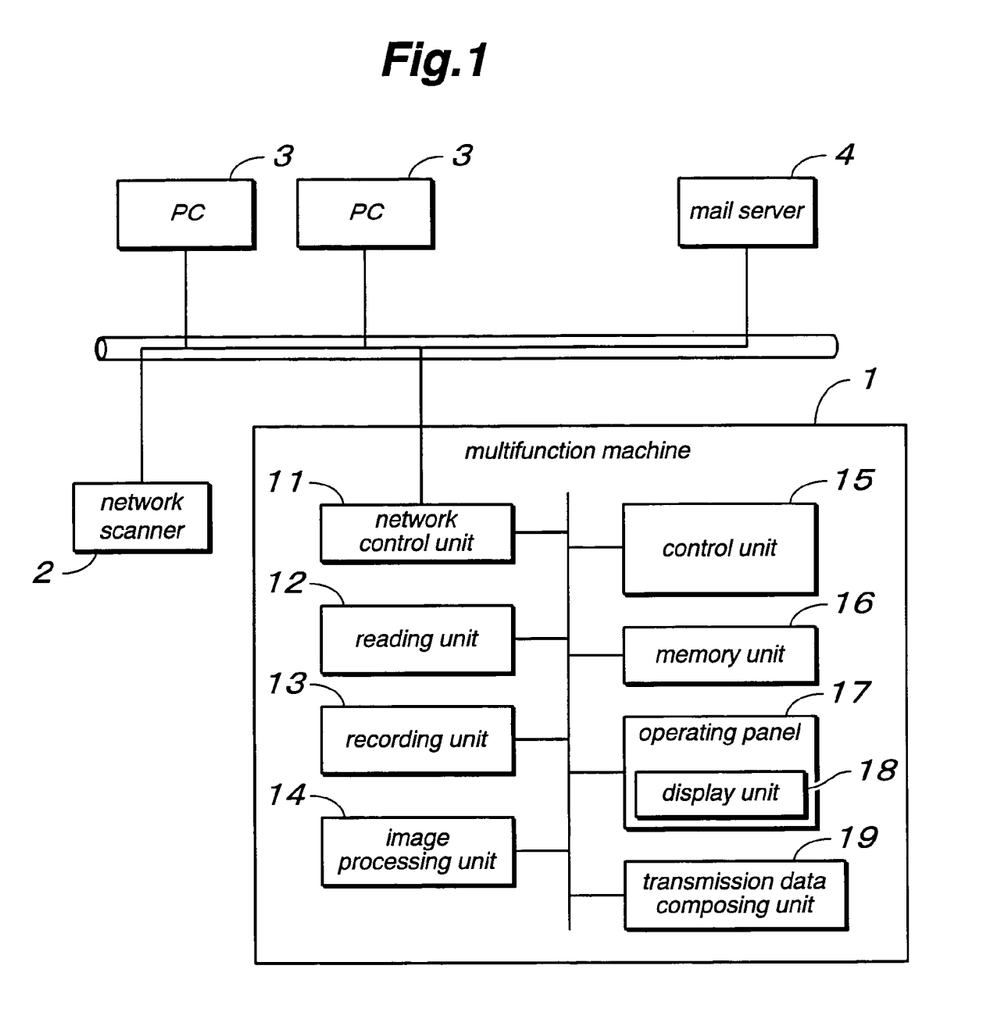
FIG. 1 is a block diagram showing a read data transmission system embodying the present invention.

FIG. 1 is a block diagram of a read data transmission system embodying the present invention. In this example, a multifunction machine 1 and a network scanner 2 according to the present invention are connected to a plurality of PCs (terminals) 3 via a LAN (local area network) to be shared by them. A mail server 4 is also connected to the LAN for administering the transmission and reception of electronic mail when the multifunction machine 1 transmits read data as electronic mail.

The PC 3 is installed with driver software adapted for the multifunction machine 1 and network scanner 2, and this driver software is incorporated with the function of a status monitor for acquiring information on the multifunction machine 1 and network scanner 2. Once the PC 3 is started, it is placed in a state ready for receiving transmission data from the multifunction machine 1 and network scanner 2 at all times.

The multifunction machine 1 comprises a network control unit 11, a reading unit 12 for reading the image of an original document, a recording unit 13 for printing image data, an image processing unit 14 for performing a prescribed image processing on the image data, a control unit (control means) 15 for controlling the actions of the various units, a memory unit 16 for storing destination information and system configuration information, an operating panel 17 for commanding various processes, selecting the configuration for each process, and entering various pieces of information, and a transmission data composing unit 19 for composing transmission data. The operating panel 17 is provided with a display unit 18 for displaying the status of the system and registered information.

This multifunction machine 1 is incorporated with the functions of a copier, facsimile, network scanner and printer. The function of a copier can be accomplished by printing the image data acquired by the reading unit 12 at the recording unit 13. The function of a facsimile can be accomplished by transmitting the image data and printing the received image at the recording unit 13. The function of a network scanner can be accomplished by transmitting the image data to a PC3 via the LAN. The function of a printer can be accomplished by printing the image data received via the LAN at the recording unit 13. The network scanner 2 may be similar to the multifunction machine 1 except for that the recording unit 13 is absent.

The transmission data composing unit 19 composes a transmission data file of a prescribed file format from the image data acquired by the reading unit 12. The file format may consist of TIFF, PDF or the like, and can be selected from the operating panel 17 by an operator. The transmission data composing unit 19 can assign to the file either a default standard file name stored in the memory unit 16 or an arbitrary file name selected by the operator. The operator can designate the file name from the operating panel 17.

Figure 2:
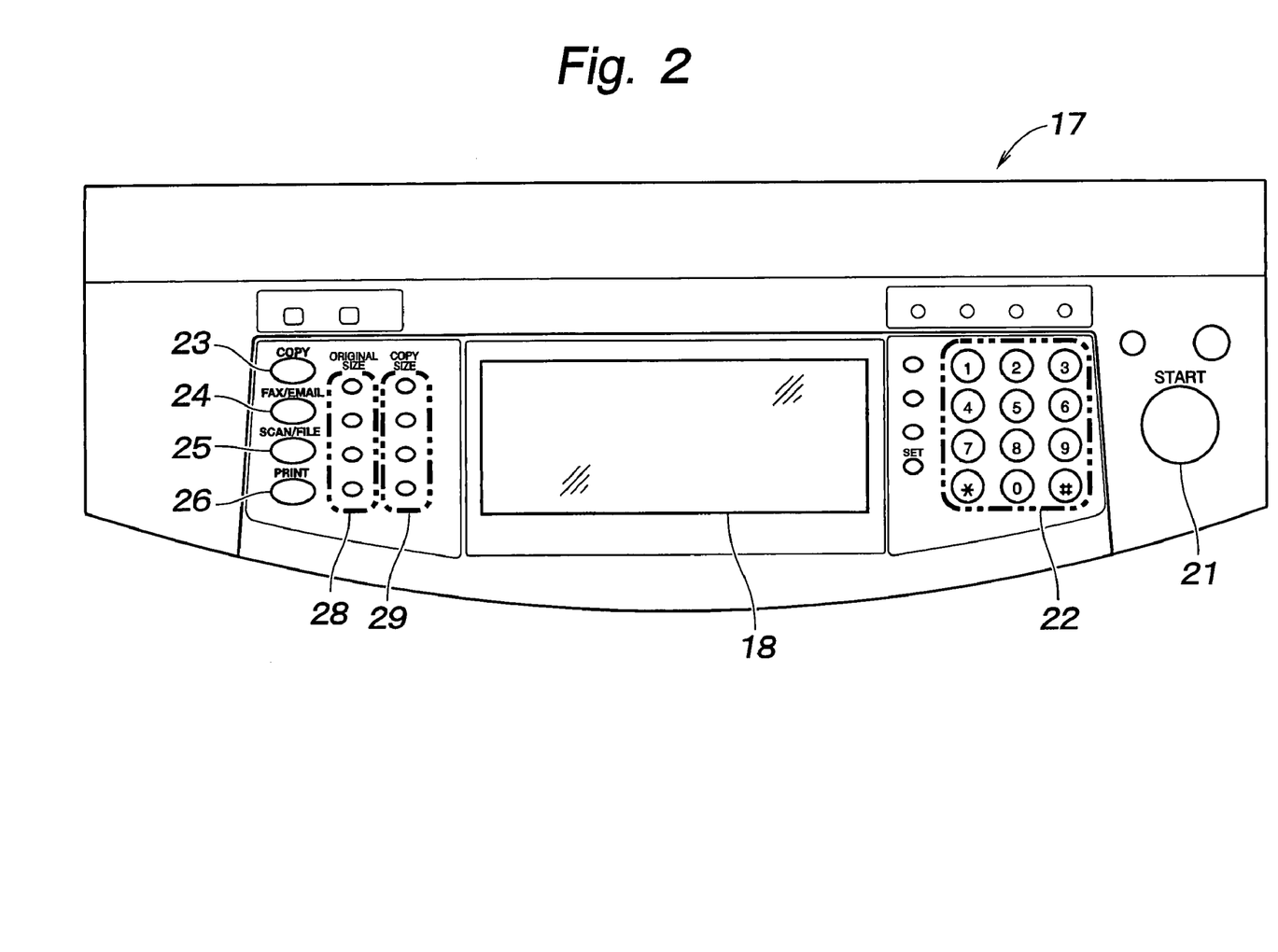
FIG. 2 is a front view showing the external appearance of the operating panel of the multifunction machine shown in FIG. 1.

FIG. 2 is a front view showing the external appearance of the operating panel 17 provided on the multifunction machine 1 shown in FIG. 1. The operating panel 17 includes a start key 21 for staring the various processes such as reading the original document and performing facsimile transmission, a ten-key 22 for entering a telephone number for the facsimile function and other data, and function selection keys 23 to 26 for selecting from the functions of a copier, facsimile, scanner and printer. The display unit (input means and display means) 18 in the form of a large touch-panel display unit is centrally placed in the operating panel 17. Additionally, an original size designation key 28 for designating the size of the original document that is to be read and a copy size designation key 29 are also provided in the operating panel 17.

Figure 3:
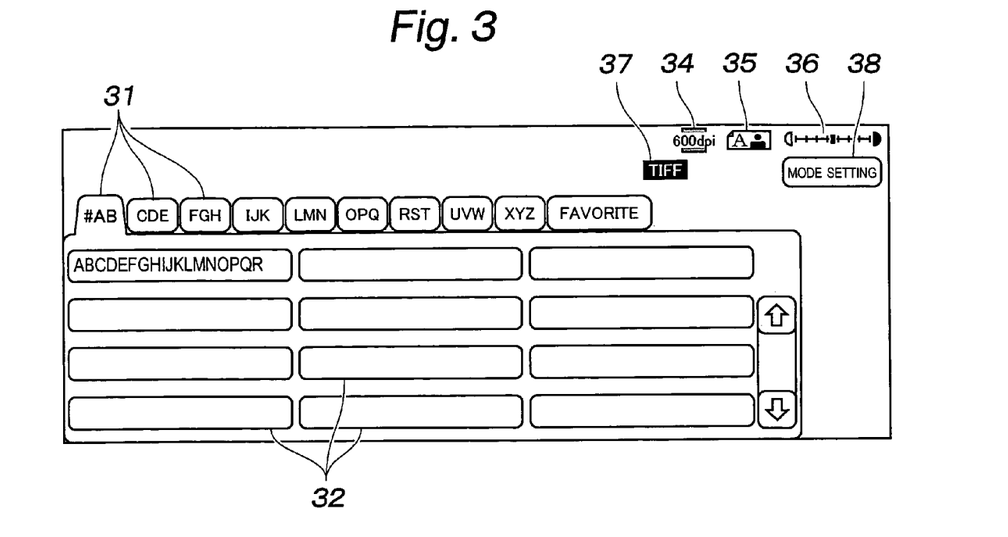
FIG. 3 is a view showing the destination designating screen on the display unit illustrated in FIG. 2.

FIG. 3 shows the screen for designating a destination on the display unit illustrated in FIG. 2. This destination designating screen is obtained by operating the scanner function selection key 25 and calling forth the scanner mode. A number of destinations are placed under a plurality of directory holders in the alphabetical order, and the destinations under each directory holder can be displayed by pushing a corresponding tag 31. A desired destination can be selected by pushing one of the destination designating buttons 32 bearing the name of the desired destination thereon.

A group of icons are arranged in the upper right corner of the destination designating screen for displaying the reading conditions. More specifically, the group of icons include an icon 34 indicating the resolution power, icon 35 indicating the image processing method, icon 36 indicating the density, and icon 37 indicating the format of the transmission file. Near this group of icons is placed a mode setting button 38 for selecting a screen for modifying these reading conditions.

Figure 4:
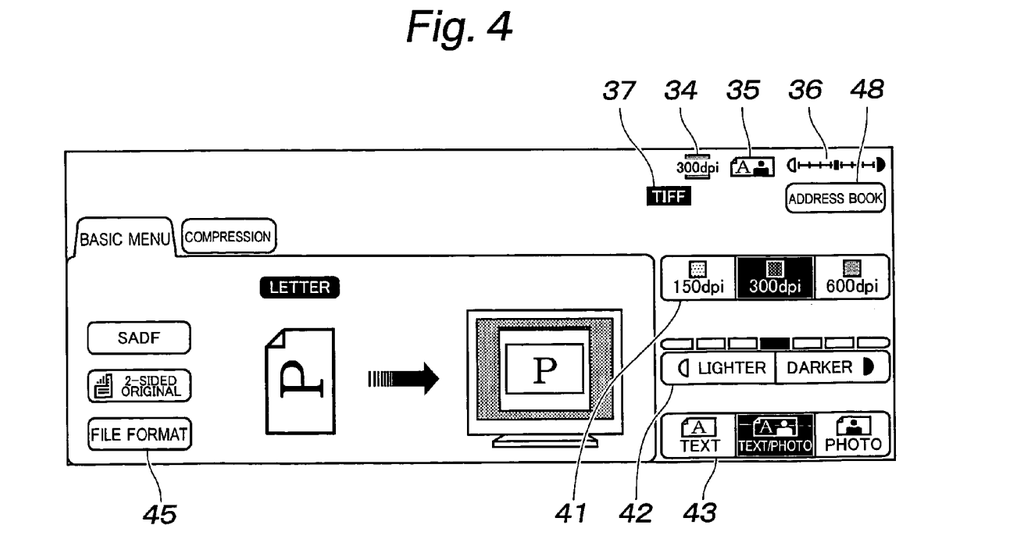
FIG. 4 is a view showing the reading condition designating screen on the display unit illustrated in FIG. 2.

FIG. 4 shows the reading condition designating screen on the display unit illustrated in FIG. 2. This screen can be obtained by pressing the mode setting button 38 on the destination designating screen shown in FIG. 3 or the like. This screen includes a resolution designating area 41 for selecting the resolution power from 150 dpi, 300 dpi and 600 dpi, a density designating button 42 for adjusting the density in a stepwise fashion, and an image processing method designating button 43 for selecting the image processing method that is suited for text images, text/photograph images and photograph images. By pressing each of these buttons, the setting is modified, and the icons in the upper right corner of the display are changed accordingly. Near the group of icons in the upper right corner of the display is placed an address book button 48 for retuning to the destination designating screen illustrated in FIG. 3.

The reading condition designating screen additionally includes a basic menu and a data compression menu for designating additional settings. The basic menu includes a file format button 45 for displaying a screen for designating a file format, and the data compression menu allows a selection of a data compression format such as MR, MMR and JBIG. In this display unit 18, the black-and-white of each button reverses when it is pressed.

Figure 5:
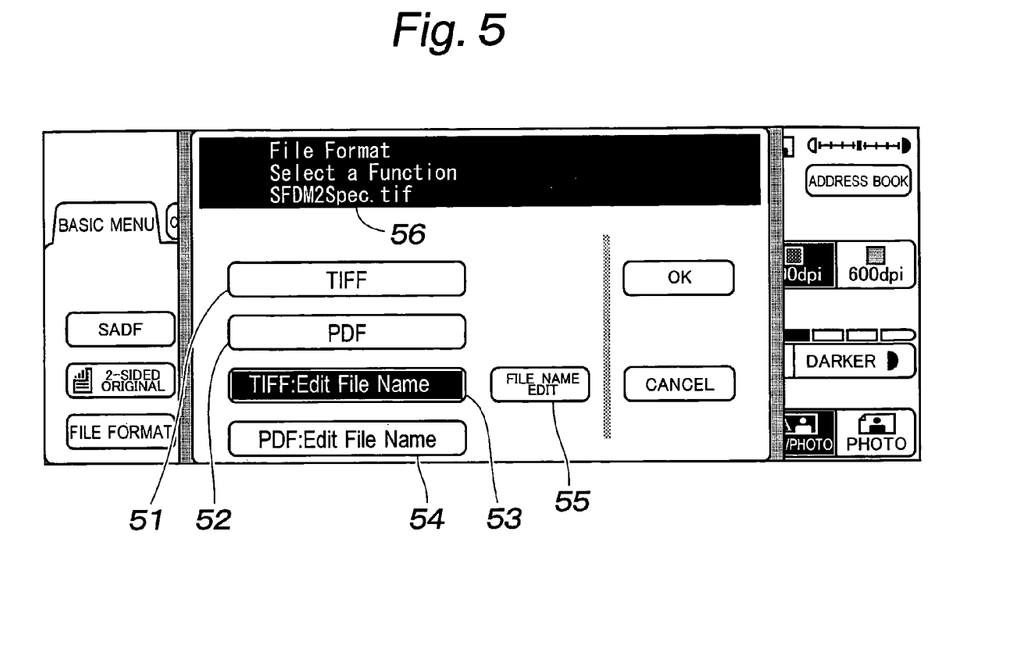
FIG. 5 is a view showing the file format designating screen on the display unit illustrated in FIG. 2.

FIG. 5 shows the file format designating screen on the display unit illustrated in FIG. 2. This file format designating screen pops up on the reading condition designating screen illustrated in FIG. 4 by pressing the file format button 45 in the reading condition designating screen. This screen includes selection buttons 51 to 54 for selecting one of the TFF and PDF formats, and the upper TIFF selection button (TIFF) 51 and PDF selection button (PDF) 52 are used when a standard file name is used without creating a new file name while the lower TIFF selection button (TIFF: Edit File Name) 53 and PDF selection button (PDF: Edit File Name) 54 are used when a file name is to be created by the user.

The upper display area 56 of the file format designating screen shows a file name (SFDM2Spec.tif), and this can be changed into a standard file name such as image.tif or image.pdf stored in the memory unit 16 as a system default by pressing either one of the selection buttons 51 and 52 for using a standard file name. The selected file name is confirmed by pressing an OK button. When either one of the selection buttons 53 and 54 for using a file name created by the user is pressed, the previously used file name is shown in the upper display area 56. When a new file name is desired to be entered, a file name edit button 55 is pressed.

Figure 6:
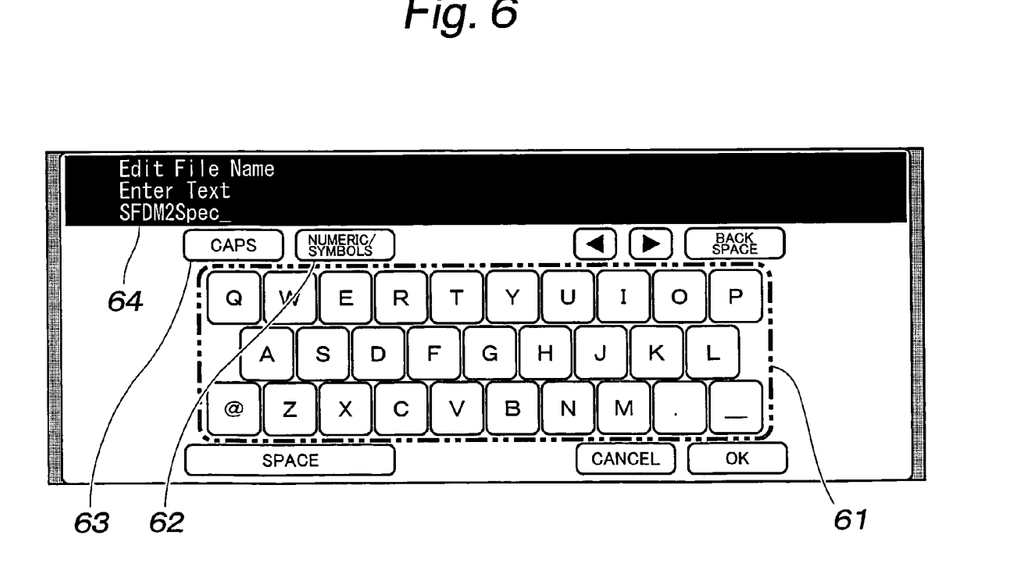
FIG. 6 is a view showing the file name editing screen on the display unit illustrated in FIG. 2.

FIG. 6 shows the file name edit screen on the display unit illustrated in FIG. 2. This file name edit screen pops up on the reading condition designating screen when the file name edit button 55 is pressed on the file format designating screen illustrated in FIG. 5. The file name edit screen includes an alphanumeric keyboard 61 of the standard QWERTY arrangement and a numeric/alphabet selection key 62 for switching over the keyboard 61 between the alphabets and numerals, and a CAPS key 63 for switching over between capital letters and small letters. The upper display area 64 of the file edit screen shows the current file name.

Figure 7:
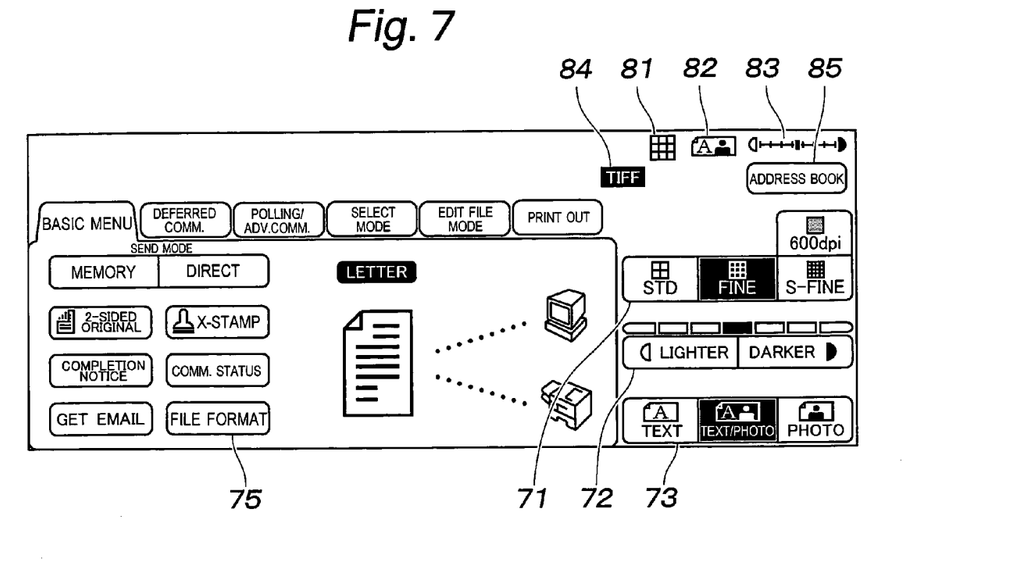
FIG. 7 is a view showing the reading condition designating screen when the facsimile function is selected on the display unit illustrated in FIG. 2.

FIG. 7 shows the reading condition designating screen when the facsimile function is selected on the display unit illustrated in FIG. 2. When the facsimile mode is selected by pressing the facsimile function selection key 24 on the operating panel 17, the destination designating screen similar to that shown in FIG. 3 is displayed, and this reading condition designating screen is displayed by pressing the mode setting button in the destination designating screen. This screen includes a resolution designating button 71 for selecting the resolution power from standard (STD), fine (FINE), super fine (S-FINE) and 600 dpi, a density designating button 72 for selecting the density in a stepwise fashion, and an image processing method designating button 73 for selecting the image processing method that is suited for text images, text/photograph images and photograph images.

The basic menu of the reading condition designating screen includes a file format button 75 for designating a file format. By pressing this file format button 75, the file format designating screen illustrated in FIG. 5 is obtained, and the designation of a file format and entry of a file name for transmitting the read data in the form of electronic mail is enabled.

Similarly as was the case with the screen for the scanner mode illustrated in FIG. 4, the upper right corner of the screen shows an icon 81 indicating the resolution power, icon 82 indicating the image processing method, icon 83 indicating the density, and icon 84 indicating the format of the transmission file. Near this group of icons is placed an address book button 85 for returning to the destination designating screen.

When the read data is transmitted in the form of electronic mail, the electronic mail containing the data generated by reading an original document is forwarded to the mail server 4, and the PC3 receives the read data from the mail server 4 as electronic mail.

Figure 8:
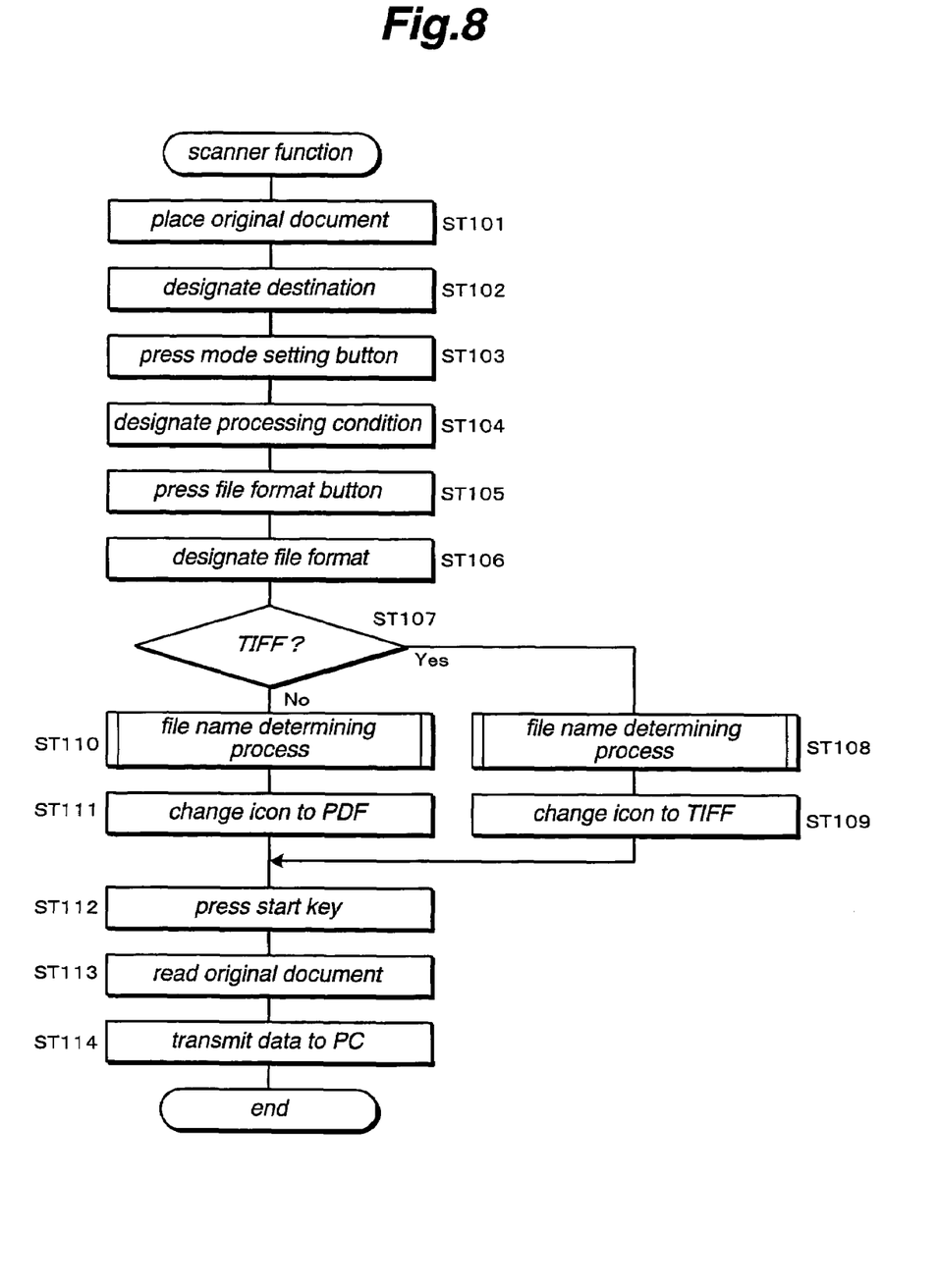
FIG. 8 is a flowchart showing the operation and control process when the scanner function is selected on the multifunction machine illustrated in FIG. 1.

FIG. 8 is a flowchart showing the operation and control process of the multifunction machine when the scanner function is selected on the multifunction machine shown in FIG. 1. First of all, an original document is placed on the reading unit 12 (step 101), and the scanner function selection key 25 is pressed. Then, the destination designating screen shown in FIG. 3 is displayed, and a destination is entered so as to designate a destination terminal (step 102). When the mode setting button 38 is pressed (step 103), the reading condition designating screen illustrated in FIG. 4 is obtained, and the reading conditions such as resolution power is allowed to be entered (step 104). By pressing the file format button 45 on the same screen (step 105), the file format designating screen illustrated in FIG. 5 is obtained so as to allow the file format to be designated from this screen (step 106).

It is then determined if the file format is TIFF (step 107). If so, the file name determining process is conducted for selecting a TIFF file name (step 108), and the format icon 37 in the group of icons in the upper right corner of the display unit is changed into the one corresponding to a TIFF file (step 109). If not or if the file format is PDF, the file name determining process is conducted for selecting a PDF file name (step 1110), and the format icon 37 is changed into the one corresponding to a PDF file (step 111).

When the start key 21 is pressed under this condition (step 112), the reading unit 12 starts reading the original document (step 113), and a transmission file of a prescribed format is generated to be forwarded to the PC (step 114).

Figure 9:
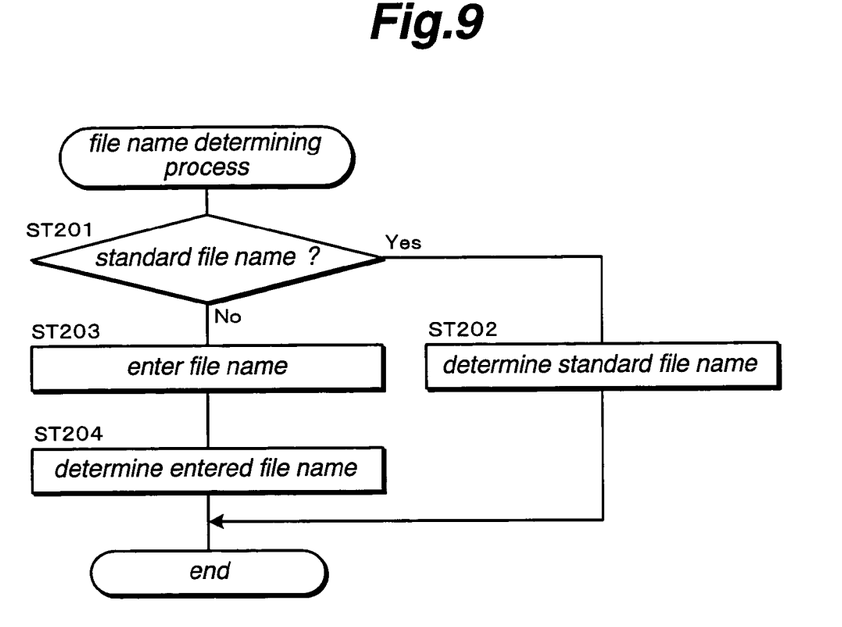
FIG. 9 is a flowchart showing the process of determining a file name illustrated in FIG. 8.

FIG. 9 is a flowchart showing the control flow of the file name determining process illustrated in FIG. 8. First of all, it is determined if the standard file name given as a system default is to be used (step 201). If the standard file name is to be used, the standard file name is read from the memory unit 16, and a file name determining step is conducted accordingly (step 202). On the other hand, if the standard file name is not to be used, the file name editing screen illustrated in FIG. 6 is displayed and a desired file name is allowed to be entered (step 203) and a file name determining step is conducted accordingly (step 204).

Figure 10:
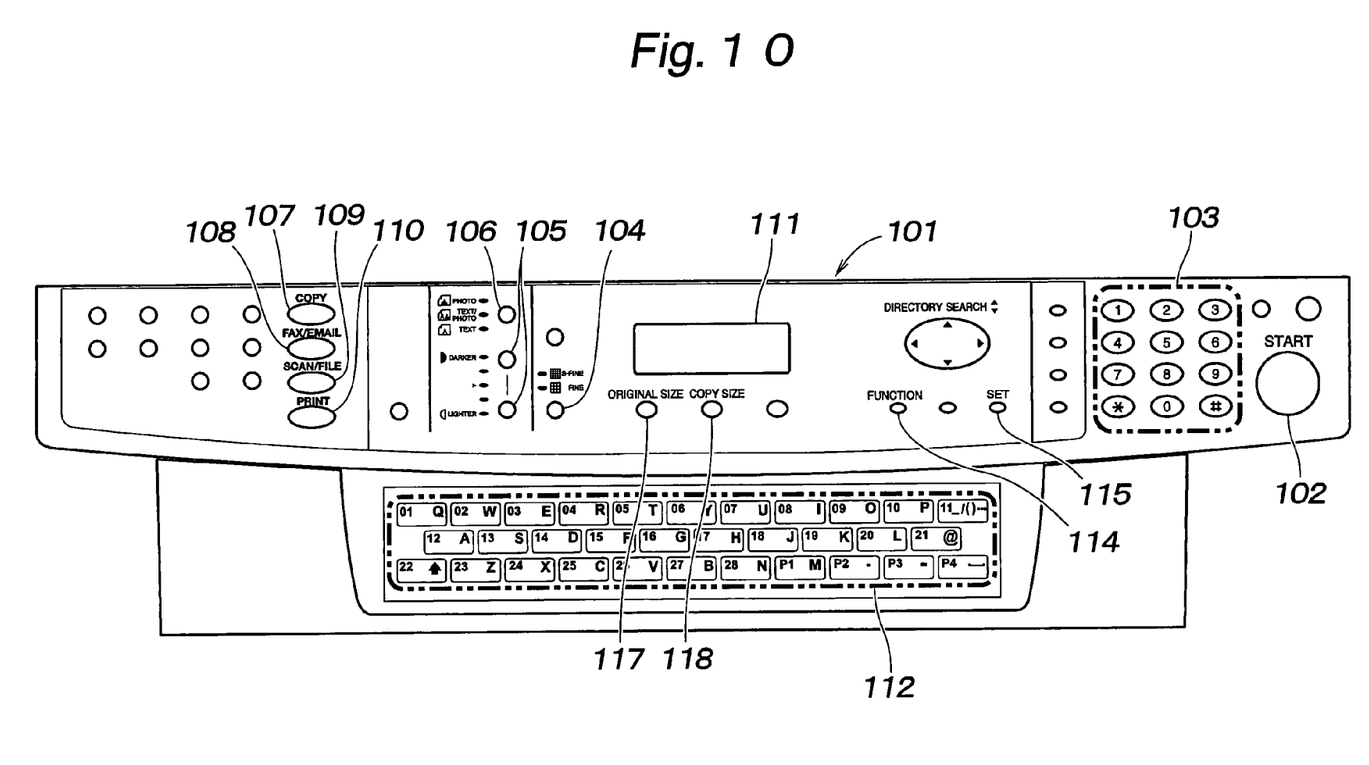
FIG. 10 is a front view showing the external appearance of another embodiment of the operating panel of a multifunction machine according to the present invention.

FIG. 10 is a front view showing another embodiment of the operating panel for a multifunction machine according to the present invention. This operating panel 101 comprises a start key 102 for staring the various processes such as reading the original document and performing facsimile transmission, a ten-key 103 for entering a telephone number for the facsimile function and other data, a resolution designating key 104 for designating a resolution power from standard (STD: all the LEDs are out), fine (the FINE LED turns on) and super fine (the S-FINE turns on), a density designating key 105 for adjusting the density in a stepwise fashion, an image processing method designating key 106 for selecting the image processing method that is suited for text images, text/photograph images and photograph images, and function selection keys 107 to 110 for selecting from the functions of a copier, facsimile, scanner and printer. A relatively small display unit 111 is provided centrally in the operating panel 101.

The operating panel 101 additionally includes a one-touch key 112 for allowing a destination to be registered individually. The one-touch key 112 is additionally assigned with alphabets and symbols according the standard QWERTY arrangement so that it can be also used as a regular keyboard by changing the input mode. Additionally, an original size designation key 117 for designating the size of the original document that is to be read and a copy size designation key 118 are also provided in the operating panel 101.

Figure 11:
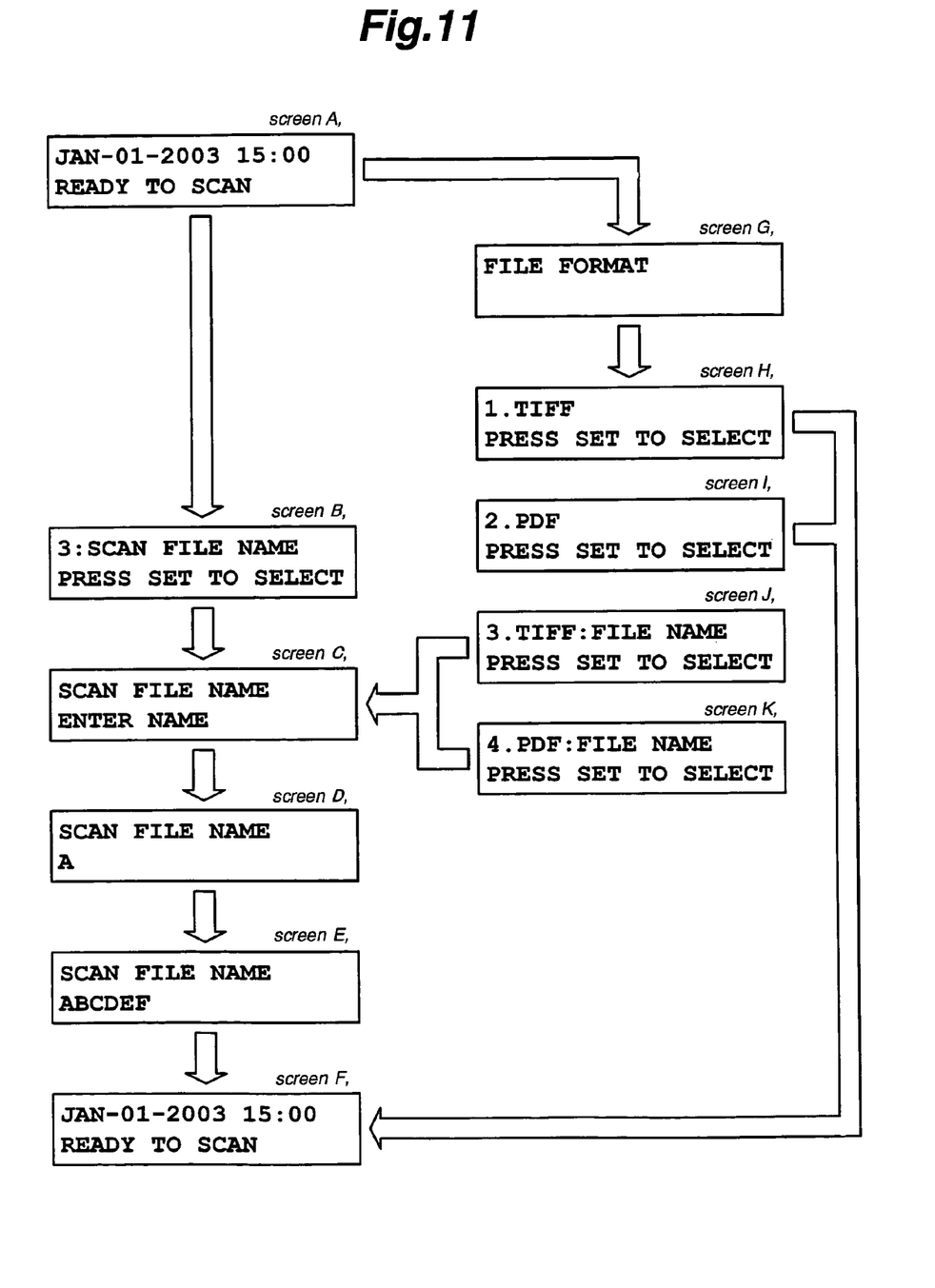
FIG. 11 is a diagram showing how the display screens are switched over on the display unit illustrated in FIG. 10.

FIG. 11 shows the way the display screen is changed on the display unit 111 illustrated in FIG. 10. When the scanner mode is selected by pressing the scanner function selection key 109 on the operating panel 101, the screen on the display unit 111 changes to a screen A indicating a ready state for reading an original document. Then, by appropriately operating the function key 114, ten-key 103 and set key 115, a screen B for selecting the file name input mode is obtained. When the file name is confirmed by pressing the set key 115, the screen changes to a screen C for entering a file name. A character string is then entered from the one-touch key 112 as shown in screens D and E and confirmed by pressing the set key 115. This determines the file name, and the screen F indicating a state ready for reading an original document is shown again. The reading process can be now started by pressing the start key 102.

When a screen G for selecting a mode for designating a file format is displayed by operating the function key 114, ten-key 103 and set key 115 on the screen A, and the file format is confirmed by pressing the set key 115, by suitably pressing the ten-key 103, one can select any one of a screen H for the mode for using the TIFF standard file name, screen I for the mode for using the PDF standard file name, screen J for the mode for using a TIFF file name entered by the user, and screen K for the mode for using a PDF file name entered by the user. The selected mode can be confirmed by pressing the set key 115. When the file name is entered by the user (in the cases of the screens J and K), a screen C for entering a file name is obtained to allow the user to enter the file name.

The network scanner and multifunction machine according to the present invention allow the work efficiency to be improved when reading an original document by designating various processing conditions, and are particularly suitable for applications where data obtained by reading an original document is forwarded to information processing terminals such as PCs that are connected to a network.

Although the present invention has been described in terms of preferred embodiments thereof, it is obvious to a person skilled in the art that various alterations and modifications are possible without departing from the scope of the present invention which is set forth in the appended claims.

The invention claimed is:

1. A scanner for reading an original document and forwarding read data to a designated terminal connected to a network, comprising:
    an operating panel configured to input and display processing conditions, the processing conditions including file format information, resolution power information, image processing method information, and density information; and
    a controller that acquires the processing conditions from the operating panel, reads an original document, generates transmission data according to the file format information input from the operating panel and forwards the transmission data to a designated terminal according to the acquired processing conditions,
    wherein the operating panel displays icons indicating a selected file format, resolution power, image processing method, and density at least when the operating panel displays a screen for designating the terminal and displays a screen for designating the processing condition.

2. The scanner according to claim 1, wherein the operating panel displays an icon indicating a selected file format.

3. The scanner according to claim 1, wherein the processing conditions includes a file name for the transmission data, and the controller allows an operator to input the file name from the operating panel.

4. The scanner according to claim 3, wherein the operating panel comprises keys configured to input characters, and the controller allows the operator to input the file name, the file name comprising a string of characters input by the keys.

5. The scanner according to claim 4, wherein the controller allows an operator to select one of a standard file name stored in a memory unit and an arbitrary file name that can be entered from the operating panel.

6. The scanner according to claim 4, wherein the operating panel includes a touch panel, and the controller displays a keyboard containing the keys to input the file name.

7. The scanner according to claim 1, further comprising a printer.

8. A scanner for reading an original document and forwarding read data to a designated terminal connected to a network, comprising:
    a reading unit that reads an original document by scanning and generating corresponding image data;
    a transmission data composing unit that processes the image data into transmission data;
    a network control unit that forwards the transmission data to a plurality of terminals connected to the network;
    an operating panel including a display unit and a plurality of input keys; and
    a control unit that controls the reading unit, the transmission data composing unit, the network control unit and the operating panel;
    wherein the operating panel is configured to allow an operator to select image processing conditions of the image data,
    the image processing conditions comprise a file name, a file format, resolution power, image processing method, and density, and
    the operating panel is configured to display icons indicating a selected file format, resolution power, image processing method, and density at least when the operating panel displays a screen for designating the terminal and when the operating panel displays a screen for designating the image processing conditions.

9. The scanner according to claim 8, wherein the display unit comprises a touch panel that provides at least one of said input keys.

10. The scanner according to claim 8, wherein the image processing conditions include at least one of an original document size and a copy size.

11. The scanner according to claim 8, wherein the transmission data is transmitted as electronic mail.

12. The scanner according to claim 8, wherein the scanner is incorporated with a function of a facsimile machine.

13. The scanner according to claim 8, further comprising a recording unit that prints the image data.

14. The scanner according to claim 13, wherein the scanner is incorporated with a function of a copier.

* * * * *